United States Patent Office 3,485,158
Patented Dec. 23, 1969

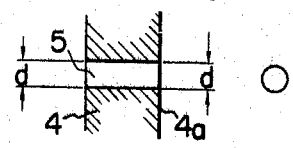
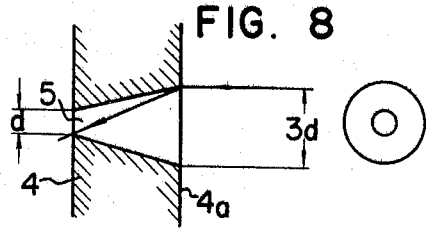
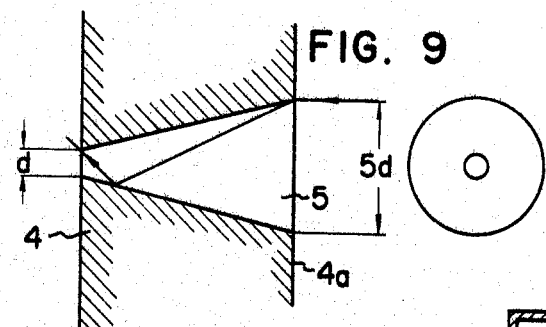
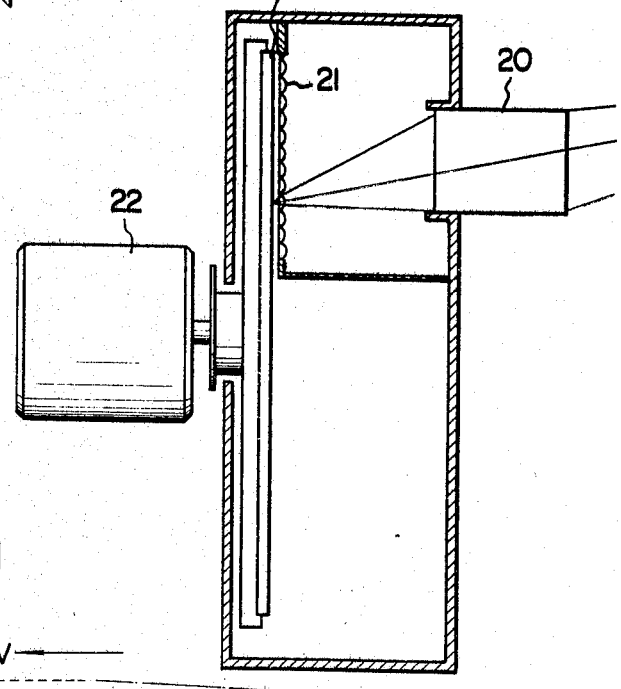
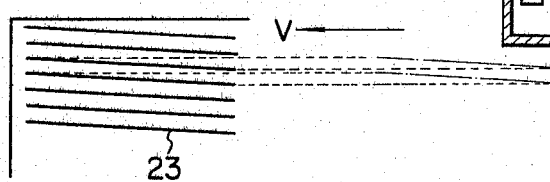

3,485,158
TIME-CONTINUOUS PHOTOGRAPHY
Takashi Kumagai, 231 Kinuta-machi, Setagaya-ku, Tokyo-to, Japan
Filed Mar. 31, 1967, Ser. No. 627,360
Claims priority, application Japan, Aug. 27, 1966, 41/560,961
Int. Cl. G03b *19/02*
U.S. Cl. 95—36                    2 Claims

ABSTRACT OF THE DISCLOSURE

A camera apparatus for taking time-continuous photographs. The image of an object which forms a picture is divided by a distributing device into minute picture elements. The minute picture elements are projected onto a moving photosensitive medium through a lens system. The picture elements are distributed on the photosensitive medium in a pattern without overlapping of the paths. The recorded paths of the picture elements are reproduced to form a composite by a reversal development of the photosensitive medium.

Background of the invention

This invention relates to photography and more particularly to cinematography and high-speed photography. More specifically, the present invention concerns a new technique in photographic recording which is continuous with time (herein referred to as "time-continuous photography" or "time-continuous photographic recording").

Heretofore, time-continuous photographic recording of objective images has been approached, but not truly attained, by techniques such as those in motion pictures (cinematography) and recordings by video tape recorders. In all of these techniques, the photographic recordings are successive series of intermittently photographed images, utilization of the phenomenon of persistence of vision being made to produce the illusion of continuous action. Actually, however, there remain unphotographed images corresponding to time instants or short periods between adjacent frames of images.

Summary of the invention

It is an object of the present invention to provide an apparatus for accomplishing true time-continuous photographic recording and reproduction thereof without flickering of the image.

Another object of the invention is to provide camera and projection apparatuses for time-continuous photography which are relative simple in construction and operation.

Still another object of the invention is to provide miniaturization of photosensitive plates in apparatuses for time-continuous photography.

A further object of invention is to provide a method and apparatus for facilitating high-speed photography through utilization of the technique in time-continuous photography according to the invention.

A still further object of the invention is to provide substantially increased photosensitivity in apparatuses for time-continuous photography.

The foregoing objects, as well as other objects and advantages, have been achieved by the present invention, in general, by dividing the entire photographic picture into picture elements consisting of a large number of minute points or lines and suitably staggering or shifting the dispositional pattern of these picture elements so that when the entire pattern is moved in a specific direction over a distance greater than the entire picture width, the paths respectively described (or scanned) by the picture elements do not mutually overlap.

The nature, principle, and details of the present invention, as well as the utility thereof, will be more clearly apparent from the following detailed description with respect to preferred embodiments of the invention when read in conjunction with the accompanying drawings in which like parts are designated by like reference numerals and characters.

Brief description of the drawings

In the drawings:

FIG. 7 consists of a greatly magnified sectional view (on the left) and a view orthogonal thereto (on the right) showing the shape of a hole in a perforated plate;

FIGS. 8 and 9 respectively consist of views similar to those of FIG. 7 and respectively show the shapes of other holes in a perforated plate;

FIG. 10 is a simplified schematic view illustrating one example of a camera apparatus for time-continuous photography in which a photosensitive plate in the form of a rotating disk is used; and FIG. 11 is a schematic view indicating another example of picture elements.

Detailed description of the invention

Figure 1:
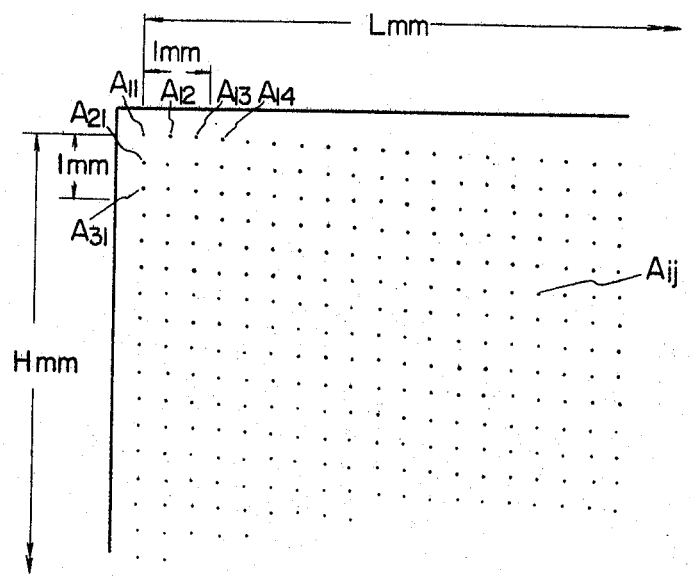
FIG. 1 is a fragmentary, enlarged, planar view showing picture elements corresponding to one time instant in one example of a photosensitive plate on which photographs continuous in time according to the invention have been taken.

A photographed picture according to the present invention is composed of picture elements, each of minute area, which are distributed over the entire expanse of the picture with a density of from a number of elements to a number of tens of elements in a square millimeter as illustrated by an enlarged example model in FIG. 1. These picture elements are so arranged that, even when the entire picture consisting of these picture elements is moved in one direction, their paths will not mutually overlap, or be superimposed.

Figure 2:
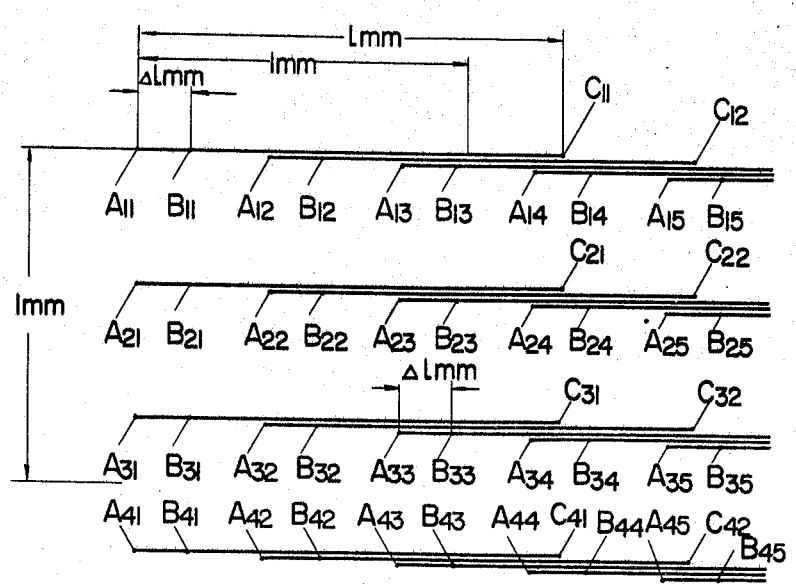
FIG. 2 is a greatly magnified view indicating the picture elements and paths described thereby of a photograph which is continuous for a certain time period.

The picture elements $Aij$ in FIG. 1, that is:

$A_{11}, A_{12}, A_{13}, \ldots A_{1n};$
$A_{21}, A_{22}, A_{23}, \ldots A_{2n};$
$A_{31}, A_{32}, A_{33}, \ldots A_{3n};$
$A_{m1}, A_{m2}, A_{m3}, \ldots A_{mn},$ constitute a single photographic image. In the case when these elements are moved to the right with time, if they are disposed as indicated on an even larger scale in FIG. 2, the paths of the picture elements will not mutually overlap and will merely trace parallel lines of a number equal to $m \times n$.

Moreover, since these parallel lines record the bright and dark variations with time of the respective picture elements, if the picture elements are moved through a distance $l$ mm. in a time interval of $t$ seconds, the picture elements $C_{ij}$ obtained at the resulting position will form a photographic image which is obtained $t$ seconds after that of the picture elements $A_{ij}$. Accordingly, picture elements $B_{ij}$ obtained at any intermediate position $\Delta l$ mm. form an image $\Delta t$ seconds behind that of picture elements $A_{ij}$. Thus, the aggregation of these groups of picture elements form a photographic image which is fully continuous with time.

Then, if it is assumed that each picture element is a circle of a diameter of $\frac{1}{125}$ mm., and the overall resolution is selected to be P=2.5 lines/mm., which is approximately that of newspaper photographs, the following values of $n$ and left-to-right width L of the picture (per sheet) are obtained for the condition that the paths of the picture elements $A_{11}$, $A_{12}$, $A_{13}$, . . . $A_{1n}$ will not mutually overlap even when these picture elements are moved infinitely.

$$n \leq d/P = 50$$

where $d$ is the diameter of each picture element.

$$L \leq n/P = 20 \text{ mm}$$

Then, if the vertical height H of the picture is taken to be 30 mm., a time-continuous photograph of substantially the same size and definition as a newspaper portrait photograph will be obtained. In the case where the distance of movement is short, of course, it is possible to enlarge the width L of the picture by changing the dispositional arrangement of the picture elements.

Figure 3:
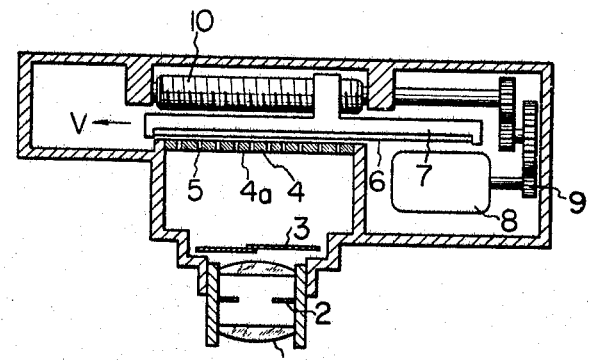
FIG. 3 is a horizontal sectional view illustrating a basic structure of a camera apparatus for taking time-continuous photographs, said apparatus being to be improved by the present invention.

The above described picture elements can be obtained by the camera apparatus as illustrated in FIG. 3. In this camera apparatus, incident light from an object (not shown) enters the apparatus through a camera lens system 1, a diaphragm 2, and a shutter 3, forms an image on surface 4a of a perforated plate 4, and, passing through minute holes 5 thereby to be distributed as picture elements, causes a photosensitive plate 6 to be exposed to the light of the picture elements.

The photosensitive plate 6 is supported by a plate holder 7 which is caused by a feed screw 10 driven through a gear train 9 by a motor 8 to travel at a velocity of V mm./second in the direction of the arrow in FIG. 3.

Figure 4:
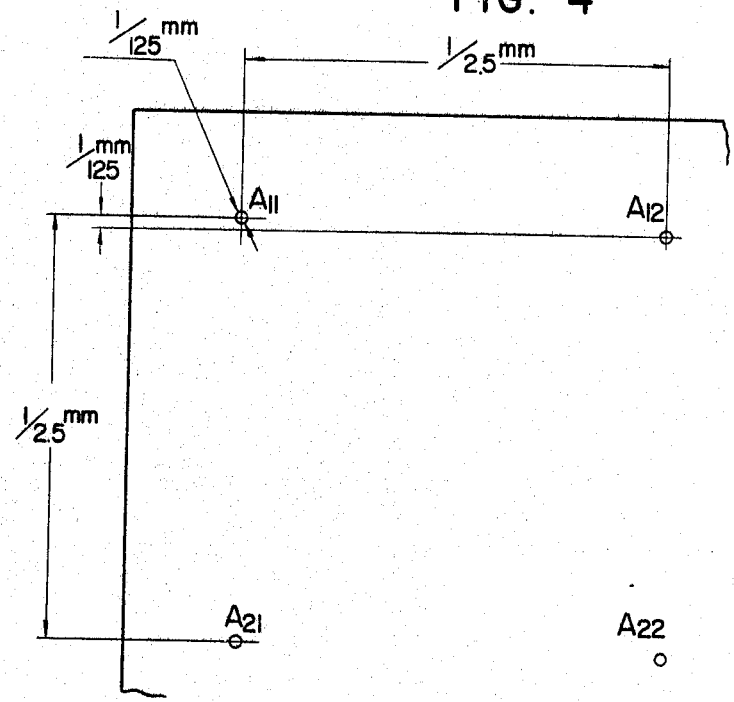
FIG. 4 is a greatly magnified view indicating the disposition of holes in a multiple-hole perforated plate in the interior of the camera apparatus illustrated in FIG. 3.

As shown on a greatly enlarged scale in FIG. 4, the small holes 5 of the perforated plate 4 are of such size and disposition as to form the above mentioned picture elements $A_{ij}$.

Thus, when the photosensitive plate 6 is caused to travel, together with the holder 7, in the arrow direction through a distance $l$ mm. in a time interval $t$ seconds ($V=l/t$) while the shutter 3 is maintained in its open state to cause the light from the object to reach the photosensitive plate 6 in the above described manner, the aforedescribed picture element paths $A_{ij}$–$B_{ij}$–$C_{ij}$ are all delineated continuously on the photosensitive plate 6. In this case, if the distance $l$ of travel is short, the same effect can be obtained also by moving the perforated plate 4, instead of the photosensitive plate 6, in the direction opposite to that of the arrow.

Figure 5:
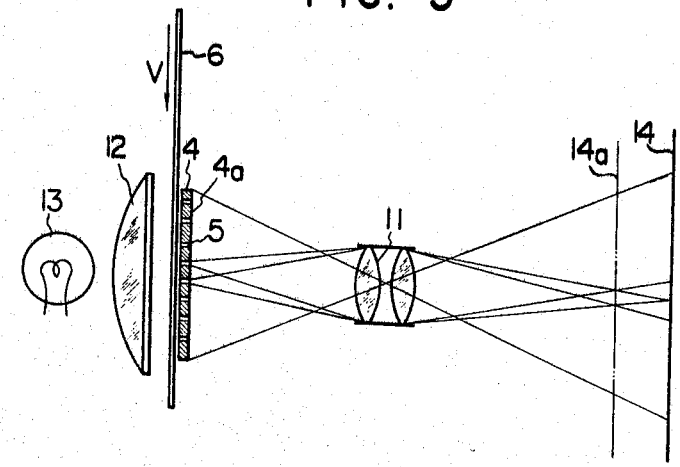
FIG. 5 is a schematic side view indicating the principle of one example of a projecting apparatus for reproducing a time-continuous photographic image according to the invention.

Then, by subjecting the photosensitive plate 6 to reversal development and projecting the light therethrough and through a perforated plate identical to the perforated plate 4 shown in FIG. 3 onto a projection screen 14 as indicated in FIG. 5, it is possible to reproduce the photographic image continuously for each successive instant of time.

One example of a projection apparatus for this purpose is illustrated schematically in FIG. 5 and comprises a light source 13, a condenser lens 12, with the perforated plate 4 positioned immediately downstream from the exposed and developed photosensitive plate 6, a projection lens system 11, and a projection screen 14. In the operation of this projection apparatus, in order to reduce irregularities of light on the projection screen 14 to a minimum, it is preferable to offset the focus, for example, to a position 14a, to impart a vignette effect to the projected image.

Thus, by moving the exposed and developed plate 6 at the velocity V mm./second in the arrow direction, it is possible to reproduce a motion picture (or cinematograph) which is completely free of flickering due to frame spacing. Heretofore, the complete elimination of flickering particularly in projection at infinitesimally low speeds has been an impossibility, but the present invention has now solved this problem.

The apparatus of FIG. 3 is disadvantageous in that the picture size cannot be reduced or enlarged at will and it is not possible to adjust the photosensitivity and improve the definition of the picture. Moreover, there is an apprehension of contact between the surface of the photosensitivity plate 6 and the perforated plate 4, and the velocity of the plate 6 cannot be increased.

Figure 6:
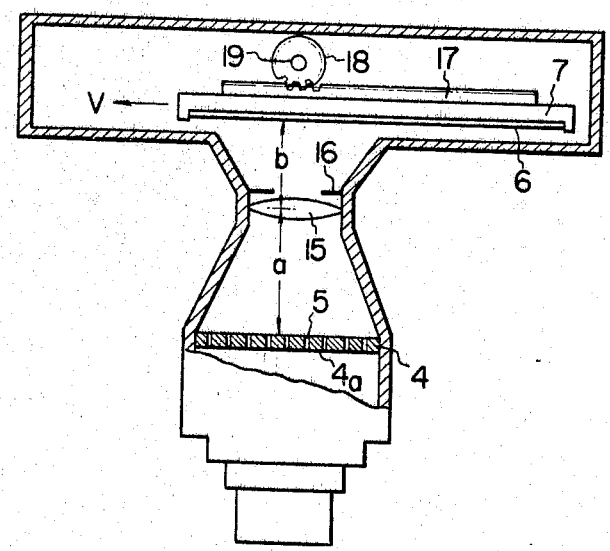
FIG. 6 is a partly sectional view illustrating one example of a camera apparatus embodying the invention.

The above mentioned disadvantages can be effectively eliminated by the apparatus illustrated in FIG. 6 in which the structure between the object and the perforated plate 4 is entirely the same as in FIG. 3 and hence such structure is omitted. In FIG. 6, between the perforated plate 4 and the photosensitive plate 6, there are provided a lens 15 for passing the light issuing through the minute holes 5 of the plate 4 and a diaphragm 16, whereby focusing is first attained at the perforated plate 4 and second at the photo sensitive plate.

According to the apparatus of FIG. 6, the picture size can be reduced or enlarged by varying the ratio of the distance $a$ between the perforated plate 4 and the lens 15 and the distance $b$ between the lens 15 and the photosensitive plate 6, that is, the ratio $a:b$. Furthermore, it is possible to adjust the photosensitivity, improve the definition of the picture, and effect other adjustments. Moreover, contact between the surface of the photosensitive plate 6 and the perforated plate 4 can be avoided.

Furthermore, in the apparatus of FIG. 6 the plate holder 7 for supporting the photosensitive plate 6 is porvided with a rack 17 fixed thereto and driven by a pinion 18 which is fixed to a motor-driven shaft 19. Accordingly, the velocity V of the photosensitive plate can be readily increased to a high value, whereby this camera apparatus is advantageous for high-speed photography.

In the time-continuous photography according to the present invention as illustrated, when the diameter of the picture elements is selected to be $\frac{1}{125}$ mm., a travel of $\frac{1}{125}$ mm. corresponds to a film travel equivalent to one frame in conventional cinematography. Therefore, a conventional motion picture of 10-minute length at a film speed of 16 frames/second can be duplicated without flicker by the technique of the present invention with a travel of the photosensitive plate 6 of only 80 mm. Furthermore, by moving the photosensitive plate 6 at a velocity of 800 mm./second, high-speed photography at a rate equivalent to 100,000 frames/second by conventional technique can be readily accomplished.

The shape of the photosensitive plate 6, of course, is not limited to a rectangular plate and may take other forms. For example, the photosensitive medium may be made as a rotatable disk as illustrated by disk 26 in FIG. 10, which disk 26 is driven by a motor 22, or one part of a rotatable cylindrical surface (not shown) may be used for the photosensitive plate within the limits of the depth of focus. In either case the traveling velocity of the photosensitive medium can be increased to a substantially high value. In the case of a rotatable disk, however, since the paths of the picture elements describe circles, it is necessary to dispose the minute holes 5 of the perforated plate also to conform to corresponding polar coordinates.

When the rotatable disk 26 is made with a diameter of 200 mm. and rotated at a rotational velocity of 10,000 r.p.m., and the region near the periphery of this disk is used for photography, the resulting speed of photography in terms of the conventional film frame speed is approximately 10,000,000 frames/second.

Examples of shapes for the minute holes 5 in the perforated plate 4 according to the present invention are illustrated in FIGS. 7, 8, and 9. In contrast to the straight hole of constant diameter $d$ shown in FIG. 7, the holes shown in FIGS. 8 and 9 are tapered holes having expanded diameters on their incident light sides. Accordingly, the hole shown in FIG. 8 can utilize a light quantity, including once-reflected light, which is approximately 9 times that of the straight hole, and the hole shown in FIG. 9 can utilize a light quantity, including twice-reflected light, which is almost approximately 25 times that of the straight hole. Therefore, even when the reflection efficiency is considered, the hole shown in FIG. 9 can produce a photosensitivity which is approximately 15 times that of the straight hole as shown in FIG. 7.

Furthermore, since the requisite conditions for the picture elements are that each be of a minute area and that the paths they describe do not mutually overlap, the picture elements may be in the form of lines 23 as illustrated in FIG. 11. Accordingly, in order to obtain picture elements in the form of points or lines, the distributing member corresponding to the perforated plate need not always be a perforated plate but may be an aggregation of minute lenses 21 as shown in FIG. 10 with each having at least one surface which is a portion of a sphere or may be an aggregation of minute lenses of other shapes such as minute partly cylindrical lenses.

By the practice of the time-continuous photographic technique according to the present invention as described above, not only can true time-continuous photographic records be made, but numerous other advantages such as simplification of camera and projection apparatuses miniaturization of the photosensitive plate, facilitation of high-speed photography, and increase in photosensitivity are derived.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. In a camera apparatus making photographic records continuously with time, comprising an image projecting system including a photographing lens system and a shutter operative to receive light from an object and form an image thereof, a photosensitive plate, a light distribution device disposed, within the depth of focus of the lens system, between the lens system and the photosensitive plate, said light distributing device dividing the image in the form of incident light therefrom into picture elements of respective minute areas distribution over the surface of the picture, said photosensitive plate movably mounted relative to the picture elements in a specific direction for describing and photographically recording respective paths of the picture element on the photosensitive plate, and said picture elements being distributed with a dispositional pattern such that no paths thus described will mutually overlap, and another lens system provided between the light distributing device and the photosensitive plate for projecting the object-image focussed on the light distributing device by said photographing lens system onto the photosensitive plate to again focus said image thereon.

2. The camera apparatus for making photographic records continuously with time as claimed in claim 1, including a holder for holding the photosensitive plate, a rack for said holder, a pinion meshing with said rack and a motor for driving said pinion.

References Cited

UNITED STATES PATENTS

| 2,596,740 | 5/1952 | Tuttle | 95—36 XR |
| 2,943,533 | 7/1960 | Goodbar. | |
| 3,099,195 | 7/1963 | Goodbar | 95—37 |
| 3,267,826 | 8/1966 | Browning | 95—18 |
| 3,383,997 | 5/1968 | Jonker | 95—36 XR |

NORTON ANSHER, Primary Examiner

LEO H. McCORMICK, Jr., Assistant Examiner

U.S. Cl. X.R.

95—18